(12) United States Patent
Chen et al.

(10) Patent No.: US 8,907,002 B2
(45) Date of Patent: Dec. 9, 2014

(54) COATINGS FOR USE IN HIGH HUMIDITY CONDITIONS

(71) Applicants: Yue Chen, Edison, NJ (US); Navin Tilara, Roseland, NJ (US); Jean Frederick Mauck, Hackettstown, NJ (US); Shijun Yang, Maple Glen, PA (US); Yakov Freidzon, South Orange, NJ (US); Robert J. Sheerin, N. Caldwell, NJ (US)

(72) Inventors: Yue Chen, Edison, NJ (US); Navin Tilara, Roseland, NJ (US); Jean Frederick Mauck, Hackettstown, NJ (US); Shijun Yang, Maple Glen, PA (US); Yakov Freidzon, South Orange, NJ (US); Robert J. Sheerin, N. Caldwell, NJ (US)

(73) Assignee: Columbia Insurance Company, Omaha, NE (US)

( * ) Notice: Subject to any disclaimer, the term of this patent is extended or adjusted under 35 U.S.C. 154(b) by 175 days.

(21) Appl. No.: 13/721,973

(22) Filed: Dec. 20, 2012

(65) Prior Publication Data

US 2014/0179859 A1    Jun. 26, 2014

(51) Int. Cl.
    *C08K 3/34*     (2006.01)
    *C08F 8/30*      (2006.01)
    *C09D 133/04*   (2006.01)

(52) U.S. Cl.
    CPC .................................. *C09D 133/04* (2013.01)
    USPC ........................................ 524/493; 524/555

(58) Field of Classification Search
    CPC ...................................................... C09D 133/04
    USPC .......................................................... 524/493
    See application file for complete search history.

(56) References Cited

U.S. PATENT DOCUMENTS

| | | | |
|---|---|---|---|
| 3,856,546 A | 12/1974 | Weiss | |
| 4,219,454 A | 8/1980 | Iacoviello | |
| 4,783,342 A | 11/1988 | Polovina | |
| 6,060,556 A * | 5/2000 | Collins et al. | 524/533 |
| 6,114,045 A | 9/2000 | Juhue et al. | |

FOREIGN PATENT DOCUMENTS

| | | |
|---|---|---|
| WO | 9852980 | 11/1998 |
| WO | 2011133487 | 10/2011 |
| WO | 2012087920 | 6/2012 |

\* cited by examiner

*Primary Examiner* — Hui Chin
(74) *Attorney, Agent, or Firm* — Maryellen Feehery Hank; Reed Smith LLP

(57) ABSTRACT

The present invention is directed to a coating composition comprising a vinyl acrylic copolymer latex wherein said copolymer latex has a water contact angle of about 60° or higher on the dried latex film surface, wherein said copolymer latex further has a specific water vapor permeability of about 0.5 mg/cm$^2$/mm/24 hr. The invention is also directed to the copolymer latex itself. Further, the invention is a method of improving a coating's ability to withstand a high humidity environment comprising adding a vinyl acrylic copolymer latex to the coating composition wherein said copolymer latex has a water contact angle of about 60° or higher on the dried latex film surface, and wherein said copolymer latex further has a specific water vapor permeability of about 0.5 mg/cm$^2$/mm/24 hr.

6 Claims, No Drawings

COATINGS FOR USE IN HIGH HUMIDITY CONDITIONS

BACKGROUND OF THE INVENTION

Coatings used in bath and spa applications encounter problems due to the conditions of high humidity that are present in such environments. Some problems associated with coatings used in high humidity environments include water marks, streaks, and defacement issues. Some existing coating products have good water vapor repellency but relatively low water vapor permeability. These products tend to perform well when the coating is relatively fresh; however, when the coating is aged, even just a few months after application, the water vapor permeability can decrease to an undesirable level, weakening the coating's resistance to water vapor condensation. This can then result in some or all of the problems noted above.

Another drawback to existing coatings is found when such products are applied over a previously coated surface. The water repellency of the coatings is weakened by surfactants leached from previous coatings, which can also lead to water marks, streaks, and defacement issues. Existing coatings designed for high humidity applications also tend to be costly.

Silicone resins may offer improved features over the existing coatings; however, they have drawbacks as well. For example, silicone resins tend to be quite costly. Also, they may exhibit poor flow and leveling properties which is undesirable for interior coatings. Problems with recoating may also be present.

An example of an existing coating is Perma-White Mold & Mildew Proof Interior Paint by Zinsser (which is intended to be applied in bath and kitchen areas). This product along with samples of flat paint (ID: JAM0516) and resin paint (ID: EXP-4539) from Dow Chemicals were tested under conditions of high humidity and performed poorly in terms of water vapor condensation resistance. Thus, there is a need for improved coatings for use in high humidity applications.

Prior art formulations differ from the current invention in various ways. For example, the abstract of JP 2008003580 describes a protective film for LCD polarizing plates which comprises a coating layer having a polymer which includes a chlorine containing monomer, which is not part of the present invention. It discloses that the protective film has a water vapor permeability at 60° C. and 95% relative humidity of less than 300 g/m$^2$/day. Further, it fails to teach the water contact angle of the present invention.

The abstract of JP2007047776 describes a display panel that has a polarizing plate with a protective film. It discloses that the ratio of water-vapor permeability of protective film after and before maintaining the display device in a 95% relative humidity environment for 24 hours is 0.003-0.6. Again, it fails to teach the water contact angle of the present invention.

U.S. Pat. No. 3,736,287 describes an aqueous vinyl acrylic interpolymer emulsion and its use in latex paints. The latex paints described are said to provide a high degree of burnish resistance, scrub resistance, ease of stain removal, and low temperature coalescence. There is no mention of water vapor permeability or of a desired water contact angle.

U.S. Pat. No. 5,969,025 is directed to a water-based adhesive composition comprising a blend of adhesive polymers in an aqueous system, wherein the blend of adhesive polymers is: 20-60% by weight of an acrylic polymer having a polarity balance expressed as water absorption according to DIN 53495 of 3 to 20%; and 40-80% by weight of a compatible tackifying resin having a degree of hydrophobicity measured as the contact angle between a dried film of the resin and a drop of distilled water of not less than 60°, the percentages being based on the total of acrylic polymer plus tackifying resin expressed as dry solids. Thus, as noted above, the invention of the '025 patent requires a blend of an acrylic polymer and a tackifying resin, which the present invention does not have.

U.S. Pat. No. 6,114,045 is directed to the films obtained by applying and drying a latex based on special acrylic monomers. These coatings are both flexible and have low surface tack and surface tension. The low tack and hydrophobic nature are provided by the special acrylic monomers. While the coatings are hydrophobic, there is no mention of them being water permeable, and expectations are that they would have poor water permeability. The reference does not disclose the inclusion of a VeoVa monomer or similar monomer, which is included in the present invention.

SUMMARY OF THE INVENTION

The present invention provides for a coating composition which comprises a vinyl acrylic copolymer latex which exhibits a hydrophobic surface property measured as a water contact angle of about 60° or higher on the dried latex film surface, and which latex exhibits a specific water vapor permeability of about 0.5 mg/cm$^2$/mm/24 hr or higher. In certain embodiments, the vinyl acrylic copolymer latex has a water contact angle of at least about 70° on the dried latex film surface. In other embodiments, the vinyl acrylic copolymer latex has a specific water vapor permeability (sometimes referred to as the specific permeability) of about 0.6 mg/cm$^2$/mm/24 hr or higher. The invention also relates to the vinyl acrylic copolymer latex described above.

The coating composition of the invention optionally comprises a micronized amorphous silica extender pigment. The coating composition of the present invention optionally further comprises a silicone additive. The micronized amorphous silica extender pigment and/or the silicone additive can be added to the coating composition to enhance performance of the coating.

The coating composition of the present invention exhibits both high water vapor repellency (also known as high surface hydrophobicity) measured as a water contact angle of about 85° or higher on the dried paint film surface, and a specific water vapor permeability of about 0.85 mg/cm$^2$/mm/24 hr or higher, resulting in good resistance to water vapor condensation on the coating surface under high humidity conditions, such as in bath and spa environments, as well as good physical film properties. In certain embodiments, the coating composition of the present invention has a water contact angle of at least about 95° on the dried paint film surface. In other embodiments, the coating composition has a specific water vapor permeability of about 0.9 mg/cm$^2$/mm/24 hr or higher. The balance of film properties and resistance to water vapor condensation serve to minimize water marks, streaks and defacement problems that often occur on coatings used in such applications due to a rundown of condensed moisture. The coatings of the present invention also maintain good physical integrity under conditions of high humidity.

The coating compositions of the present invention also provide improved scrub resistance compared to existing products. Scrub resistance is the ability of a coating to resist marring when the coating is cleaned or washed to remove stains or marks. This is simulated by using a brush coated with an abrasive cleaner which is dragged across the surface until marring is noted. A modified version of ASTM D2486 is used by Applicant to assess scrub resistance. This allows the coatings of the present invention to be prepared in lower sheen or matte finishes that are ordinarily not available for high moisture areas, such as baths and spas, but are desirable and often preferred due to their rich appearance and depth of color.

The coating compositions of the present invention also offer environmental advantages over existing products in that the Volatile Organic Compound (VOC) level is lowered to <50 g/L. In addition, the coating compositions of the present invention are free of alkylphenol ethoxylates (APEO free).

An additional advantage of the coating compositions of the present invention is a cost savings over the existing products.

DETAILED DESCRIPTION OF THE INVENTION

The current invention is directed to a coating composition comprising a vinyl acrylic copolymer latex which exhibits a hydrophobic surface property measured as a water contact angle of about 60° or higher on the dried latex film surface, and which latex exhibits a specific water vapor permeability of about 0.5 mg/cm²/mm/24 hr or higher. In certain embodiments, the vinyl acrylic copolymer latex has a water contact angle of at least about 70° on the dried latex film surface. In other embodiments, the vinyl acrylic copolymer latex has a specific water vapor permeability of about 0.6 mg/cm²/mm/24 hr or higher. The coating composition of the invention optionally comprises a micronized amorphous silica extender pigment and/or a silicone additive. The current invention is also directed to the vinyl acrylic copolymer latex itself.

The copolymer latex of the present invention generally comprises vinyl acetate or a monomer similar in structure and physical and chemical properties, such as but not limited to vinyl propionate and vinyl valerate; butyl acrylate or a monomer similar in structure and physical and chemical properties, such as but not limited to methyl acrylate, ethyl acrylate, 2-ethyl hexyl acrylate, acrylic acid, methyl methacrylate, butyl methacrylate, and methacrylic acid; and VEOVA-10 or a monomer similar in structure and physical and chemical properties such as but not limited to VEOVA-19 and VEOVA-11 along with a polymerizable surfactant and a wet adhesion monomer.

In one embodiment, the copolymer latex of the present invention comprises five monomers, namely, vinyl acetate, butyl acrylate, VEOVA-10, sodium vinyl sulfonate, and N-(2-Methacryloyloxyethyl)Ethylene Urea and is represented by the following formula:

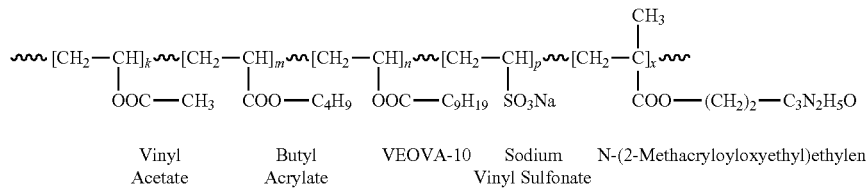

According to gel permeation chromatography (GPC) analysis, the number average molecular weight (NAVG MW) of the polymer is about 42,000 Daltons. Further, the polymer contains less than about 0.001% of materials with a NAVG MW below about 1000 Daltons, preferably below about 500 Daltons. The polymer is not soluble or dispersible in water and does not absorb water. Each monomer has the following structure:

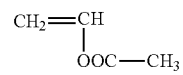

Vinyl Acetate

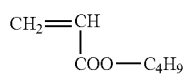

Butyl Acrylate

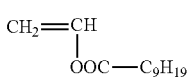

VEOVA-10

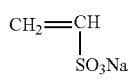

Sodium Vinyl Sulfonate

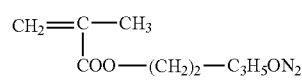

N-(2-Methacryloxyethyl)Ethylene Urea

In one embodiment of the invention, the monomers are incorporated into the polymer in the amounts set forth in Table 1. All percentages in this specification are by weight unless otherwise specified.

TABLE 1

| Monomer | % (by weight) |
| --- | --- |
| Vinyl Acetate | 60-90% |
| Butyl Acrylate | 5-30% |
| VEOVA-10 | 5-20% |
| Sodium Vinyl Sulfonate | 0.05-0.5% |
| N-(2-Methacryloyloxyethyl) Ethylene Urea | 0.5-1.5% |

Example 1 contains a method of preparing a vinyl acrylic copolymer latex of the present invention.

EXAMPLE 1

Preparation of Vinyl Acrylic Copolymer Latex

Table 2 shows the components used for the preparation of the copolymer latex. The copolymer latex of Example 1 is hereafter referred to as Latex 5.

TABLE 2

| Component | Amount |
|---|---|
| Initial Charge in Reactor | |
| Deionized water | 720 g |
| Surfactant | 0.3 g |
| pH adjuster | 3.0 g |
| Monomer Pre-Emulsion | |
| Deionized water | 450 g |
| Sodium Vinyl Sulfonate (Monomer) | 6 g |
| Surfactant | 100 g |
| Vinyl acetate (Monomer) | 1000 g |
| Butyl acrylate (Monomer) | 500 g |
| VEOVA-10 (Monomer) | 300 g |
| N-(2-Methacryloyloxyethyl) Ethylene Urea (Wet Adhesion Monomer) | 35.0 g |
| Seed Initiator Solution | |
| Sodium persulfate (Initiator) | 2.0 g |
| Deionized water | 18.0 g |
| Delayed Initiator Solution | |
| Sodium persulfate | 2.0 |
| Deionized water | 148.0 g |
| Chaser solutions | |
| 1) Bruggolite ® FF6M | 1.0 g |
| Deionized water | 20.0 g |
| 2) t-butyl hydroperoxide | 1.0 g |
| Deionized water | 20.0 g |
| Deionized water (rinse) | 90.0 g |

In one embodiment, the method used to prepare the copolymer latex of the invention comprises charging a pH adjuster, surfactant, and deionized water to a reactor, which is then agitated and heated; preparing a monomer pre-emulsion (MPE) comprising a combination of monomers, agitating the MPE; and charging the MPE into the reactor, maintaining the reactor at a specified temperature for a period of time; charging a seed initiator solution into the reactor; feeding the MPE and a delayed initiator solution into the reactor over a period of time; maintaining the reactor at a specified temperature; rinsing the lines with deionized water, and maintaining the reactor at a specified temperature for a specified amount of time; cooling the reactor to a specified temperature and adding chaser solutions; cooling the reactor to another temperature; adding biocide solutions and filtering the reactor mixture through a filter.

Examples of pH adjustors useful in the preparation of the inventive compositions may include, but are not limited to, ammonium hydroxide, sodium hydroxide, sodium carbonate, sodium bicarbonate, potassium hydroxide, potassium carbonate, potassium bicarbonate, potassium triphenylphosphate, ammonia, amines, aminoalcohols (e.g., 2-amino-2-methyl-1-propanol and/or those compounds sold under the tradename AMP™ 95 by Angus Chemical Co.), and the like, and combinations thereof. In certain cases, compounds that qualify as pH adjustors can be added for purposes other than adjusting pH (e.g., temporary deactivation of otherwise reactive functional groups, emulsion stabilization, or the like), and yet may be still characterized herein as pH adjustors.

Suitable surfactants for use in the preparation of the inventive compositions may include, but are not limited to, nonionic and/or anionic surfactants such as anionic and/or nonionic emulsifiers such as alkali or ammonium alkyl sulfates, alkyl sulfonic acids, fatty acids, oxyethylated alkyl phenols, ammonium nonoxynol-4 sulfate, sodium dodecylbenzene sulfonate, sodium dodecyl sulfonate, sodium tetradecyl sulfonate, sodium hexadecyl sulfonate, those sold under the tradename TRITON™ (e.g., QS series, CF series, X series, and the like), those sold under the tradename IGEPAL™, those sold under the tradename ABEX, those sold under the tradename RHODAPON™, those sold under the tradename RHODAPEX™, those sold under the tradename RHODAFAC™, those sold under the tradename RHODACAL™, and the like, and combinations thereof Examples of defoamers useful in the inventive compositions according to the invention can include, but are not limited to, polysiloxane-polyether copolymers such as those sold by Tego under the trade name Foamex™, those sold under the trade name BYK™, those sold under the trade name Drewplus™, those sold under the trade name Surfynol™, and the like, and combinations thereof Examples of rheology modifiers useful in the inventive compositions according to the invention can include, but are not limited to, hydrophobically modified urethane rheology modifiers, hydrophobically modified polyether rheology modifiers, alkali swellable (or soluble) emulsions, hydrophobically modified alkali swellable (or soluble) emulsions, cellulosic or hydrophobically modified cellulosic rheology modifiers. Examples are those available from Dow under the trade name Acrysol™, such as RM-8W, RM-825, RM-5000, RM-2020 NPR and RM-825, RM-5, TT-935, and Natrasol™, Natrasol Plus™ and Aquaflow™ from Aqualon Division of Hercules Inc., Coatex™ and Coapur™ from Coatex, and UCAR Polyphobe™ from Dow.

Examples of Biocides or preservatives useful in the inventive compositions according to the invention can include, but are not limited to those sold under the names Kathon™, Rocima™, or Kordek™ from Dow, or those containing 1,2-Benzisothiazolin-3-one (BIT) under the Proxel™ name, or zinc omadine available from Arch Biocides, or 5-Chloro-2-Methyl-4-Isothiazolin-3-one (CIT) or 2-Methyl-4-Isothiazolin-3-one (MIT) which are commercially available under the name Canguard™ from Dow Chemical Company, or those sold under the name Nuosept™ from ISP Corp. For the sake of clarity, the inventive compositions according to the invention may include latex compositions and/or coating compositions.

EXAMPLE 2

Preparation of a Coating Composition

Table 3 below provides the components used to make a coating composition of the invention containing the copolymer latex described in Example 1 (Latex 5). The process used to make a coating composition of the invention is within the skill of a person of ordinary skill in the coating field.

TABLE 3

Ingredients of Coating Composition

| Component/Description | Amount (lb) |
|---|---|
| Water | 105.247 |
| Propylene Glycol IND | 3.508 |
| Biocide | 2.005 |
| pH adjuster | 1.504 |
| Surfactant | 1.002 |
| Tamol 165A (Dispersant) | 11.026 |
| Defoamer | 1.002 |
| White pigment | 240.565 |
| Extender Pigment | 50.118 |
| Extender Pigment | 40.094 |
| Silica | 65.153 |
| Abex 2020 | 6.014 |
| Water | 50.118 |
| Copolymer Latex Of Example 1 | 370.871 |
| Opaque Polymer | 30.071 |
| pH adjuster | 2.255 |
| Coalescent | 12.028 |

TABLE 3-continued

Ingredients of Coating Composition

| Component/Description | Amount (lb) |
|---|---|
| Silicone | 10.024 |
| Acrysol RM-2020 NPR (Rheology modifier) | 30.071 |
| Coatex XP 1915 (Rheology Modifier) | 10.024 |
| Coapur XS 71 (Rheology Modifier) | 2.005 |
| Water | 44.751 |
| Biocide | 2.005 |
| Defoamer | 5.012 |
| Water | 13.142 |

Latex 5 was tested to determine its Water Vapor Transmission (WVT) and water contact angle (WCA) compared to controls. WVT and WCA are important parameters for minimizing water vapor condensation.

WVT was measured using a test method used internally by Applicant, as set forth in Table 4. ASTM D1653-93 (Standard Test Methods for Water Vapor Transmission of Organic Coating Films) and Instruction Manual of BYK-Gardner Permeability Cup provide additional testing information and are herein incorporated by reference. The WVT test method is used to determine the rate at which water vapor passes through films of paint, latex, or other coatings. The method used by Applicant is intended to provide relative comparisons of water vapor permeability for coating samples.

TABLE 4

WVT Test: Conditions and Materials

| | |
|---|---|
| Permeability Cups | BYK-Gardner PO-2301 (25 cm$^2$) |
| Temperature | 22 +/− 3° C. |
| Humidity | 40 +/− 10% RH |
| Balance scale | 0.001 g accuracy |
| Film Base | parchment paper for vapor permeability test (All-State International, Inc.) |

WVT Test: Procedure:

1) Prepare the Coating film. Make a drawdown with 3 mil bar on the permeability paper. Allow to dry for 1 week under laboratory ambient conditions. Cut and size to fit the permeability cup. Measure the total thickness (coating+paper) and blank paper with at least 4 data points and take the average. Weigh each dry coating sample.

2) Assemble the Sample and Cup. Load 10 ml deionized water into each permeability cup. In the following order, place the black rubber washer, aluminum ring, transparent washer, coating sample with coating surface facing down, black rubber washer into each permeability cup base. Then place the cup cap onto the cup base. Next, tighten the cap, making sure that no water spills onto the coating. Weigh the initial cup weight and record the room temperature and humidity.

3) Record Cup Weight. Record the cup weight approximately every 30 minutes until 7 or 8 data points are collected. 24 hours after the initial cup weight, record the weight of the cup again, then every 30 minutes until 5 or 6 data points are collected. The test is concluded.

4) Calculation. As is known to one of skill in the art, specific water vapor permeability is measured using the following formula: H×ΔWt×1000/25 and is measured in mg/cm$^2$/mm/24 hr, where H is the coating thickness measured in mm and ΔWt is the weight change over 24 hours measured in grams and is the average of multiple data points.

WVT testing was conducted under ambient conditions in the laboratory.

WCA Testing

The WCA (water contact angle) was measured on the coating surface with the contact angle instrument, model DM-501, made by Kyowa Interface Science Co., Ltd.

TABLE 5

WVT and WCA Testing on Copolymer Latex of Invention

| Latex | WVT mg/cm$^2$/mm/24 hr (1 week coating) | WCA on GSR (Green Sheet Rock) |
|---|---|---|
| Latex 1 (control) | 0.22 | 91.3 |
| Latex 2 (control) (all acrylic) | 0.38 | 47.5 |
| Latex 3 (control) (all acrylic) | 0.31 | 64.3 |
| Latex 4 (Invention) | 0.94 | 81.3 |
| Latex 5 (Invention) (Latex of Example 1) | 0.69 | 82.0 |

GSR, referenced in Table 5 above, is an abbreviation for green sheet rock, which is typically used in high humidity areas as it is more resistant to moisture compared to typical sheet rock used in other areas. Latex 1, Latex 2, and Latex 3, referenced in Table 5 above, are all control formulations.

As can be seen from the above results, Latex 4 of the invention has a water contact angle of 81.3° and a specific water vapor permeability of 0.94 mg/cm$^2$/mm/24 hr. Latex 5 of the invention has a water contact angle of 82° and a specific water vapor permeability of 0.69 mg/cm$^2$/mm/24 hr. None of the controls have both the required water contact angle and specific water vapor permeability.

The coating compositions of the invention were also tested to determine their Water Vapor Transmission (WVT) and contact angle (WCA) compared to control coatings. The test methods described above were used.

WVT testing was conducted under ambient conditions, with the humidity and temperature indicated in Table 4.

Vapor Condensation Tests (VCT) and Shower tests were also conducted on the coating compositions of the invention compared to control coatings. VCT and Shower tests can be used to assess water vapor condensation resistance.

Vapor Condensation Test Method

VCT (Vapor Condensation Test) was conducted according to the following method. The coated panel was conditioned in lab ambient conditions for at least 24 hours. The coated panel was placed with the test coating facing down onto a hot water bath which was stabilized at 60° C. The distance between the coating sample and the water surface was 1 inch. The test panel was removed after 15 minutes and the coating surface was observed for the degree of water vapor condensation on the coating surface. Smaller water beads and a lack of rundowns (places where water beads run down the coated surface) indicate high water repellency and high water vapor permeability of the coating composition.

Shower Test Method

The shower test was conducted in a 3×7.5 feet real shower room with no ventilation. A 4×4 feet test coating panel was installed on a wall 3 feet above the floor and outside of the shower curtain. The shower head was turned on to the full running dial having the equilibrated running water temperature of about 58° C. The shower water was stopped after 15 minuets of running After 45 minutes of recess, the next shower cycle was started the same way as described above until 7 shower cycles were completed. The coating surface was observed during the recess of each shower cycle.

The results of the WVT, WCA, VCT and Shower testing for the sample coatings are contained in Tables 6, 7 and 8. Example 2 Coating 1 is the coating prepared according to Example 2. Example 2 Coating 2 is the same as Example 2 Coating 1 except it is prepared in a different finish. Coating 3 is another coating according to the invention containing Latex 4.

TABLE 6

Test results for sample coatings compared with control coatings

| Coating Sample | Main Resin | WVT mg/cm²/mm/24 hr (measured on day 6 after coating was applied) | WCA on GSR | WCA on GSR with a semi-gloss sub coating | VCT on GSR 2 weeks | VCT on GSR with a semi-gloss sub coating 2 weeks |
|---|---|---|---|---|---|---|
| Control #1 | Latex 1 | 0.827 | 102.3 | 97.4 | beads & large beads | large beads - wet 5 rundowns |
| Control #2 | Latex 1 | 0.616 | 100.5 | 98.1 | beads | large beads - wet 9 rundowns |
| Control #3 | Latex 3 | 0.462 | 63.9 | — (no data) | Wet and rundowns | — (no data) |
| Example 2 Coating 1 | Latex 5 | 1.131 | 106.3 | 104.7 | micro beads & moist | beads & large beads No rundown |
| Example 2 Coating 2 | Latex 5 | 1.059 | 105.6 | 104.7 | micro beads & moist | beads & large beads No rundown |
| Coating 3 | Latex 4 | 1.333 | 93.6 | — (no data) | micro beads & moist | — (no data) |

TABLE 7

Test results for coatings from other sources

| Coating Sample | WVT mg/cm²/mm/24 hr (1 week coating) | WCA on GSR | VCT on GSR 2 weeks coating |
|---|---|---|---|
| Perma-White Mold & mildew Proof Interior Paint by Zinsser | 0.351 | 70.0 | Wet and many rundowns |
| Flat Paint Sample from Dow | 0.522 | 88.6 | Wet and rundowns |

TABLE 8

Shower test results for sample coatings compared with control coatings

| Coating Sample (1 week aged coating) | On GSR | On GSR with a sub coating of acrylic semi-gloss paint | On GSR with a sub coating of Alkyd paint |
|---|---|---|---|
| Perma-White Mold & mildew Proof Interior Paint by Zinsser | Wet, rundowns at shower 2 | Wet, rundowns at shower 1 | Wet, rundowns at shower 1 |
| Control #1 | Moist and micro beads | Small beads at shower 5-7 | Large beads and rundowns at shower 1 |
| Example 2 Coating 1 | Moist and micro beads | Micro beads at shower 5-7 | Micro beads at shower 1 Small beads at shower 2 Medium beads at shower 7 |

As noted above, GSR is an abbreviation for green sheet rock. As indicated in Table 6, the WCA and VCT tests were conducted under two conditions. The coating composition was applied to new green sheet rock, as is found in new construction homes. The coating composition was also applied on top of an existing coating, namely a coating of semi-gloss paint, to replicate the conditions found in older homes where coatings are applied on top of an existing coating.

As seen in Table 6, comparing the controls with the coatings of the invention demonstrates that the coatings of the invention have high WVT values as well as high WCA values. The VCT test results indicate that the coatings of the invention have improved water vapor condensation resistance over the control formulas.

As set forth in the above tables, the coatings of the invention have improved water vapor condensation resistance over the control formulas. The results indicate that the properties of the coating composition are dependent upon the properties of the copolymer latex included in the coating. A coating with a latex according to the present invention, namely having a water contact angle of about 60° or higher on the dried latex film surface, and a specific water vapor permeability of about 0.5 mg/cm²/mm/24 hr or higher, exhibits superior results in terms of high water vapor repellency and high water vapor permeability.

Another embodiment of the invention comprises a method of improving a coating's ability to withstand a high humidity environment. This method comprises adding a vinyl acrylic copolymer latex which exhibits a hydrophobic surface property as measured as a water contact angle of about 60° or higher on the dried latex film surface, and exhibits a specific water vapor permeability of about 0.5 mg/cm²/mm/24 or higher to the coating composition. Optionally, a micronized amorphous silica extender pigment and/or a silicone additive may be added to the coating composition. In a specific embodiment, the copolymer latex comprises a polymer of the following structure:

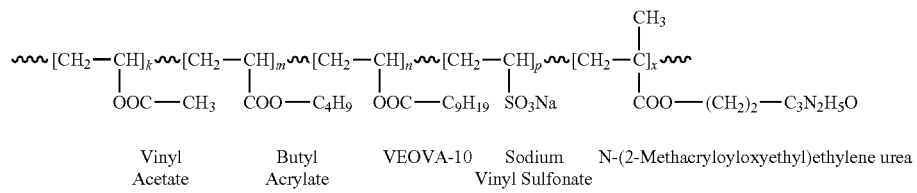

A coating composition prepared according to this method exhibits both high water vapor repellency (also known as high surface hydrophobicity) measured as a water contact angle of about 85° or higher on the dried paint (coating) film surface, and specific water vapor permeability (also referred to as the specific permeability) of about 0.85 mg/cm²/mm/24 hr or higher. In certain embodiments, the coating composition prepared according to this method has a water contact angle of at least about 95° on the dried paint film surface. In other embodiments, the coating composition has a specific water vapor permeability of about 0.9 mg/cm²/mm/24 hr or higher.

It is to be understood that while the invention has been described in conjunction with the detailed description thereof, that the foregoing description is intended to illustrate and not limit the scope of the invention, which is defined by the scope of the appended claims. Other aspects, advantages, and modifications are evident from a review of the following claims.

What is claimed is:
1. A coating composition comprising
a vinyl acrylic copolymer latex, wherein said copolymer latex has a water contact angle of about 60° or higher on the dried latex film surface, wherein said copolymer latex further has a specific water vapor permeability of about 0.5 mg/cm²/mm/24 hr, wherein said copolymer latex comprises a polymer having Formula I

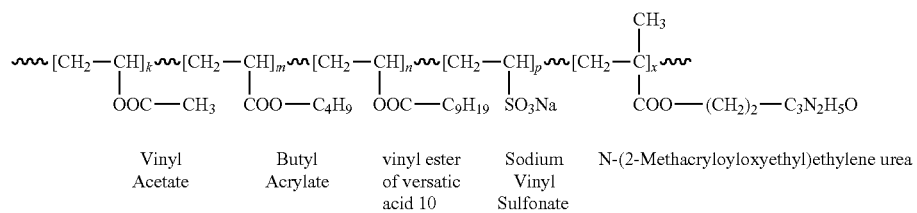

wherein the vinyl acetate is present at about 60 to about 90% by weight of the polymer, the butyl acrylate is present at about 5 to about 30% by weight of the polymer, the vinyl ester of versatic acid 10 is present at about 5 to about 20% by weight of the polymer, the sodium vinyl sulfonate is present at about 0.05 to about 0.5% by weight of the polymer, and the N-(2- methacryloyloxyethyl) ethylene urea is present at about 0.5% to about 1.5% by weight of the polymer, and wherein x=1-15, p=1-10, n=12-200, m=30-500, and k=120-2000.

2. The coating composition of claim 1 which further comprises a micronized amorphous silica extender pigment.

3. The coating composition of claim 1 which further comprises a silicone additive.

4. The coating composition of claim 1 wherein the copolymer latex has a water contact angle of about 70° or higher on the dried latex film surface and a specific water vapor permeability of about 0.6 mg/cm$^2$/mm/24 hr.

5. A latex comprising a vinyl acrylic copolymer latex having a water contact angle of about 60° or higher on the dried latex film surface and having a specific water vapor permeability of about 0.5 mg/cm$^2$/mm/24 hr, wherein said copolymer latex comprises a polymer having Formula I

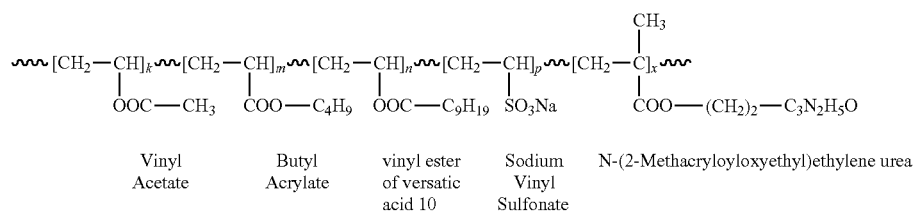

wherein the amount of vinyl acetate ranges from about 60-90%, the amount of butyl acrylate ranges from about 5-30%, the amount of vinyl ester of versatic acid 10 ranges from about 5-20%, the amount of sodium vinyl sulfonate ranges from about 0.05-0.5%, the amount of N-(2- methacryloyloxyethyl) ethylene urea ranges from about 0.5-1.5%, all by weight of the polymer, and wherein x=1-15, p=1-10, n=12-200, m=30-500, and k=120-2000.

6. A method of improving a coating composition's ability to withstand a high humidity environment comprising adding a vinyl acrylic copolymer latex to the coating composition wherein said copolymer latex has a water contact angle of about 60° or higher on the dried latex film surface, and wherein said copolymer latex further has a specific water vapor permeability of about 0.5 mg/cm$^2$/mm/24 hr, wherein said copolymer latex comprises a polymer having Formula I

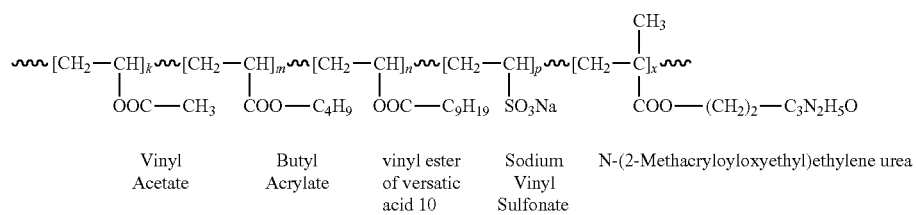

wherein the vinyl acetate is present at about 60 to about 90% by weight of the polymer, the butyl acrylate is present at about 5 to about 30% by weight of the polymer, the vinyl ester of versatic acid 10 is present at about 5 to about 20% by weight of the polymer, the sodium vinyl sulfonate is present at about 0.05 to about 0.5% by weight of the polymer, and the N-(2-methacryloyloxyethyl) ethylene urea is present at about 0.5% to about 1.5% by weight of the polymer, and wherein x=1-15, p=1-10, n=12-200, m=30-500, and k=120-2000.

* * * * *